United States Patent [19]
Ward, II

[11] Patent Number: 5,740,050
[45] Date of Patent: *Apr. 14, 1998

[54] PARKING ENFORCEMENT SYSTEM

[75] Inventor: Seth Ward, II, Little Rock, Ark.

[73] Assignee: POM Incorporated, Russellville, Ark.

[21] Appl. No.: 722,571

[22] Filed: Sep. 27, 1996

Related U.S. Application Data

[60] Provisional application No. 60/004,472, Sep. 28, 1995.
[51] Int. Cl.⁶ ........................................................ G06F 17/00
[52] U.S. Cl. .................... 364/464.28; 340/932.2; 395/213
[58] Field of Search ...................... 194/217; 340/932.2; 364/464.28; 368/90; 395/213

[56] References Cited

U.S. PATENT DOCUMENTS

| | | | |
|---|---|---|---|
| 4,260,090 | 4/1981 | Gross | 224/277 |
| 4,387,296 | 6/1983 | Newell et al. | 235/376 |
| 5,103,957 | 4/1992 | Ng et al. | 194/217 |
| 5,146,067 | 9/1992 | Sloan et al. | 235/381 |
| 5,263,118 | 11/1993 | Cornelison | 395/2.09 |
| 5,339,000 | 8/1994 | Bashan et al. | 340/932.2 |
| 5,414,624 | 5/1995 | Anthonyson | 364/423.098 |

*Primary Examiner*—Edward R. Cosimano
*Attorney, Agent, or Firm*—Robert Groover; Betty Formby; Matthew Anderson

[57] ABSTRACT

A parking citation issuing and enforcement system including an electronic citation writing device and an electronic parking meter. The system includes means whereby data, such as the status of the meter, may be transmitted between the electronic citation writing device and the electronic parking meter. The system also includes the ability to download the data from the electronic citation writing device to a computer for reporting of the citation data as well as the data retrieved from the electronic parking meter. This data cannot be manipulated while in the meter, during transmission to the electronic citation writing device, or during and after uploading to computer. Therefore, the report generated can be used in court to help resolve parking violation disputes.

58 Claims, 5 Drawing Sheets

PARKING ENFORCEMENT SYSTEM

CROSS-REFERENCE TO RELATED APPLICATION

This application claims priority from provisional 60/004,472 filed Sep. 28, 1995, which is hereby incorporated by reference. However, the content of the present application is not necessarily identical to that of the priority application.

BACKGROUND AND SUMMARY OF THE INVENTION

This invention relates to electronic systems for issuance and enforcement of parking citations. More particularly, the present invention relates to a system of communication between an electronic citation writing device and an electronic parking meter to determine the status of the meter.

Background: Electronic Parking Meters

Cities and institutions (e.g., colleges, hospitals, airports, recreational parks) that experience a shortage of parking space may utilize parking meters to receive payment for rental of individual parking spaces and to provide a visual timing method to show when the purchased time has expired.

A variety of electronic and mechanical parking meters are known in the prior art. Typical parking meters receive one or more coins to begin a timing interval during which a vehicle may remain parked in an appropriate space associated with and adjacent to the parking meter. The timing interval, or the amount of time vended by the meter to the user, is typically determined by the number and value of the coins which are inserted into the parking meter. Recently, electronic parking meters have evolved for digitally electronically vending time. An electronic parking meter, instead of using clockwork mechanical movement to measure the passage of time, uses a small electronic system (typically a micro-controller-based system, powered by battery or solar input). The use of electronic parking meters has also opened up the possibility of using other types of payment, such as smart cards. This allows the user to buy a card, with a preset value, which may be inserted into the parking meter to buy time, up to the preset limit. The primary thrust of modern parking meter technology is directed to solid state circuitry and apparatus for parking meters which minimize downtime, reduce mechanical unreliability, and provide an electronic means of accounting.

Background: Meter-Readers

Another of the attractions of electronic parking meters is their capability for electronic auditing. Portable electronic meter-reader systems have been developed, in which a portable computer electronically interfaces with an electronic parking meter to gather data indicating, for example, the amount of money which has been received in a certain time period, the number of violation incidents, the last time the cash box was open, the state of battery charge, and/or other data of this type. As an example, attention is directed to U.S. Pat. No. 5,614,892, owned by the same assignee as in this case, which is hereby incorporated by reference.

Background: Electronic Citation Writing Systems

Electronic citation writing systems have also recently come into use. Electronic citation writing equipment automates the citation writing process, provides quartz time stamping of transactions, and allows downloading of data to identify repeat offenders by vehicle license plate number. These systems permit a parking enforcement official to input the meter identification and license data from a car parked in a space beyond the time paid for into a handheld portable computer, which then prints out an appropriately filled-in parking citation form. The citation information can then be uploaded into a computer which keeps a log of all issued citations.

Citation Enforcement Problems

However, such electronic systems pose different issues in enforcement. Frequent and efficient enforcement of parking meter time is necessary to ensure that motorists insert proper payment in the parking meters, and that motorists remove their parked vehicles when the purchased time has elapsed, thus allowing other motorists to use the parking space. When an enforcement officer discovers a vehicle parked at a meter with no visible, decrementing time showing on the meter, and/or a signal indicating expired time or malfunction of the meter, a citation is issued by the enforcement officer and placed on the vehicle or given to the motorist as penalty for the parking violation.

A common problem for enforcement officials is defending and justifying issued citations in court when challenged by motorists who dispute the accuracy of the parking meters, or claim that the meters returned to zero time remaining prematurely, and/or dispute information on the citation, such as the time of day the violation occurred. If a parking ticket is contested in court, it becomes necessary to prove-up the elements of the parking violation. One of the possible defenses that motorists may assert is that the parking meter was in error, for example, that the car had been parked for less than the time that had been paid for. Such assertions can be more difficult to disprove in electronic parking meter cases, since the operation of an electronic parking system is much less obvious to a judge than the operation of a mechanical clockwork system.

Innovative Parking Enforcement System

The present application discloses a system which reduces such enforceability problems. An electronic citation writing device communicates with an electronic parking meter to receive various information, including, but not limited to, the meter status, the last payment received by the meter, the type of payment received, time and date of payment received, and if the meter returned to zero normally or was reset to zero (whether manually or automatically by vehicle detector). When the parking citation is issued, the citation writer collects historical data and current status from the parking meter, or alternatively launches the meter into a diagnostic routine, and then records the results of that diagnostic routine. This information can subsequently be downloaded to a computer for recording of the citation without the possibility of manipulation of the contents of the citation or the results of the diagnostic routine. Thus, with each citation written, there is a perfectly contemporaneous record which proves that the parking meter was functioning accurately. This provides additional evidence to rebut such defenses.

The development of intelligent parking meters allows city governments and other agencies to better monitor parking violators. The development of an intelligent Citation Writer System (CWS) to interface to already available "smart meters" will automate the citation process and allow for better legal defense and debt collection on outstanding citations. An additional benefit of this system implementation includes more accurate tracking of transactions made at the meters. Thus, this innovative system provides a synergistic use of existing technologies: smart meters are able to provide increasing amounts of information—about the transactions they perform, their own internal state, and sometimes even their environment—while meter interface units are able to "talk" to the meters, obtain up-to-the minute information contained in the meter and use this information to write parking tickets. This innovative system allows law enforcement personnel to use these electronic capabilities more fully and effectively to support their work and make enforcement easier.

In one class of embodiments, a checksum is generated which provides some electronic verification that the complete set of data, including the citation data as well as the diagnostic routine results from the parking meter, were generated and recorded at the same time.

In another class of embodiments, the citation data together with the diagnostic routine data, and preferably also the check sum generated, are recorded and transmitted electronically. This also simplifies the enforcement process and provides reliable, manageable evidence to support the issuing of the citation.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
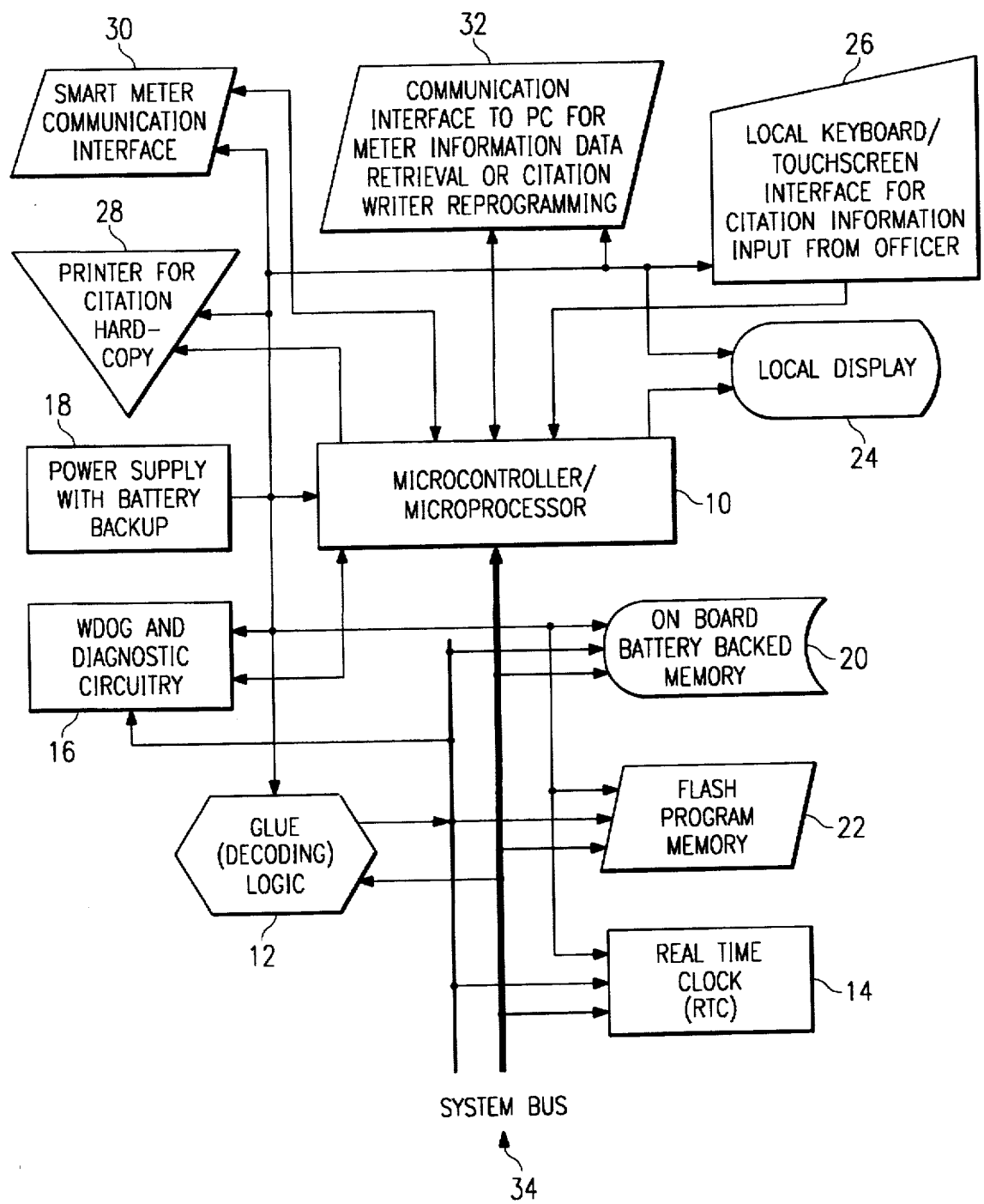
FIG. 1 is a block diagram of the electronic citation writing device.

The numerous innovative teachings of the present application will be described with particular reference to the presently preferred embodiment (by way of example, and not of limitation), in which:

FIG. 1 shows a sample electronic citation writing system (CWS) according to the present invention. The intelligent CWS includes a microprocessor (µP) or microcontroller (µC) 10 based design utilizing peripheral circuitry connected to a system bus 34 for dedicated functionality. Peripheral circuitry will be used to control and operate all functional operations such as citation printing 28, officer keypad/touchscreen input 26, smart meter communication interface 30, PC data/reprogramming interface 32, Liquid Crystal Display (LCD) operation 24, diagnostic circuitry 16, power supply circuitry 18, real time clock (RTC) circuitry 14, watchdog (WDOG) circuitry 16, data storage memory 20, flash program memory 22, and all other miscellaneous circuitry. Utilizing the latest flash memory, application specific integrated circuit (ASIC), and field programmable gate array (FPGA) technology will allow the manufacturer to change and upgrade the CWS operation in the future as well as lower service costs.

User interface software allows for permanent storage of CWS data generated during daily operation. An offsite computer downloads citation data from the CWS for use in judicial processing and debt collection. The offsite computer can also upload daily repeat violator data to the CWS as well as reprogram the operation of the CWS during upgrades.

Core Processing Unit 10

The core processing unit is composed of the main µP or µC 10 along with its associated support chips and components such as crystals, timing circuits, reset circuits, direct memory access (DMA) support chips, etc. A large variety of processors presently exist from several manufacturers. Everything from stand alone embedded µC to 64 bit RISC processors are available for any application. The choice of controller often is greatly influenced by intangibles such as readily available and cost effective development tools, speed of operation desired, and compatible interfacing capabilities. All circuitry is preferably implemented using surface mount technology (SMT). A sample embodiment utilizes a DS5000.

Decoding/Glue Logic 12

All µC and µP based circuits 10 have logic circuits connected to provide control signals for different system and component operations. These logic signals are often referred to as glue logic 12 since they often tie functional circuits together. These controls can be simple chip select signals, complex address decoding functions, or other registered outputs which are application specific. The choice of the appropriate logic circuit depends on the complexity of the overall design. Simple gate arrays or complex FPGAs may be required.

Real Time Clock (RTC) 14

A RTC 14 and its associated timing circuitry is included with the CWS and connected to the µC or µP 10. Its primary purpose will be to provide accurate time stamping of events relating to the citation writing process. Advantageously, the RTC can be a single off-the-shelf integrated circuit which also includes nonvolatile memory for long-term storage of system critical information as well as timer functions. Furthermore, the possibility of error by the parking enforcement official as to the time of day the citation was issued is eliminated.

Watch Dog (WDOG) 16

A watch dog circuit 16 and its associated hold off functions is included in the CWS and its operational firmware. The watch dog circuit 16 is a safety function connected to the µP or µC 10 that allows the system to reboot in the event it crashes or locks up for any reason. It is standard procedure to include such a module in any stand alone or embedded system.

Power Supply 18

The µP or µC 10 is connected to a power supply 18 which includes a battery backup system for operation from a portable battery supply. The power supply 18 serves to regulate and supply the appropriate circuit voltages. Additional functions of the power supply 18 include power supervision and µC or µP 10 notification during abnormal power conditions. The power supply 18 has an on board temporary power backup for data retention. The system is capable of going into temporary shutdown during inactivity to conserve battery life.

On Board Memory 20

The amount of data required per citation will influence the amount and type of memory used. The CWS contains enough memory 20 to hold all daily citation log information as well as repeat violator information that will be used to determine whether a citation is issued or a vehicle is secured and towed. For example, each citation log might require the following information:

A. Time and Date (5 bytes)
B. Transaction amount (3 bytes)
C. Meter ID# (10 bytes)
D. Meter Status (1 byte)
E. Current meter cash inventory (8 bytes)
F. Meter violation information (2 bytes)
G. Meter reset information (1 byte)
H. Meter diagnostic information (2 bytes)
I. License plate information (10 bytes)
J. Police officer ID#/badge # (10 bytes)
K. Citation type (2 bytes)
L. Citation # (2 bytes)
M. Other vehicle information (make, model, color) (100 bytes)
N. Driver License information (if available)

The μC or μP 10 receives this information from either the smart meter or from the enforcement official and stores it in the on board memory 20. Several types of memory are now available. The CWS memory 20 is preferably easily accessed with low power consumption to improve battery life. The currently used SIMM memories used in the latest computer motherboards represent a viable choice, however, the main processor used along with the support circuitry required may have an affect on this choice.

Program Memory 22

The CWS includes program memory 22 connected to the μC or μP 10. Although the application can be designed utilizing large EPROM or masked ROM technology, the recent advancements in Flash memory offer an attractive alternative. Flash memory now operates at acceptable speeds and provides for in circuit reprogrammability. This is advantageous for the CWS since the system requires continuous application updates.

On Board Display 24

The CWS includes some type of visual display packaged with the unit. Several types of character based and graphical LCDs are now available with the associated control and driver circuitry. The LCD 24 preferably contains a built-in backlight for visual accuracy during low light or adverse weather conditions. If a touchscreen is to be used, the LCD 24 will be packaged with the overlaying touchscreen and its associated control circuitry.

The local display 24 prompts the enforcement official for the correct information about the parking violation and displays information uploaded from an offsite computer concerning repeat parking violators.

Input Keyboard/Touchscreen 26

The CWS provides a user interface for the input of field data from the police/parking enforcement official. A keyboard or a user interface touchscreen 26 can be used for data input. Both a keyboard and a touchscreen require dedicated hardware for their control, and the use of a touchscreen requires additional firmware overhead for display and interpretation of input. The enforcement official can enter such information as the type of citation, vehicle make and model, color of the vehicle, license plate number, and the parking meter number.

Printer Interface 28

The CWS has an on board printer 28 for hardcopies of citations. The printer 28 only needs to be capable of printing simple ASCII characters without any graphics.

Several thermal printer manufacturers currently have printers available for bar code and other applications. These manufacturers include: Zebra, NEC, TEC, Intermec, Datamax, Sato, & BOCA Systems.

Smart Meter Communication Interface 30

The CWS also has the capability of interfacing to presently manufactured smart meters utilizing already developed interfaces and protocols. In addition, the CWS is easily adaptable for new meter communication interfaces.

In a preferred embodiment, the CWS has an interchangeable probe that can be easily changed out for different meters and attached to the meter's communication interface 50. The most widely required probe utilizes an infrared interface between the smart meter and the CWS.

The CWS design preferably includes all required communication hardware (DUARTS, driver chips, etc.) on board the CWS with the individual smart meter probe providing the custom hardware interface such as infrared, hard wired, or other wireless media. An example of sample connectors, both optical and contact interfaces, are given in PCT application US96/06005, filed Apr. 24, 1996, which has now been filed in the U.S. as U.S. application Ser. No. 08/847,428, which is a continuation-in-part of U.S. Pat. No. 5,614,892, which is hereby incorporated by reference. This reference shows an infrared probe which may be inserted into a payment slot of the meter to provide communications. In an alternate embodiment shown, the probe is docked in a dimple in the meter housing to align it properly for communications with the meter.

The μC or μP 10 sends commands to the parking meter through the smart meter communication interface 30 requesting information and/or instructing the meter to perform a diagnostic routine, and to send the results of the routine back to the μC or μP 10 during the citation writing process. The information received by the μC or μP 10, such as the status of the meter, the last payment received by the meter, the type of payment received, time and date of payment received, and whether the meter returned to zero normally or was reset to zero (whether manually or automatically by vehicle detector), is then stored in the on board memory 20.

Data Storage/Programming Interface 32

The CWS preferably provides a standard RS232 interface 32 with a 9 or 25 pin D-sub connector and all required driver chips for communication to any offsite computer via a serial port. Included in the operational firmware is the capability to download all citation and system related data for permanent storage as well as upload of repeat violator data for field background checks. This interface 32 will also be used to reprogram the on board flash memory 22 to upgrade the operational CWS firmware. In addition, cellular links may be incorporated for real-time background checks with a central office.

Figure 2:
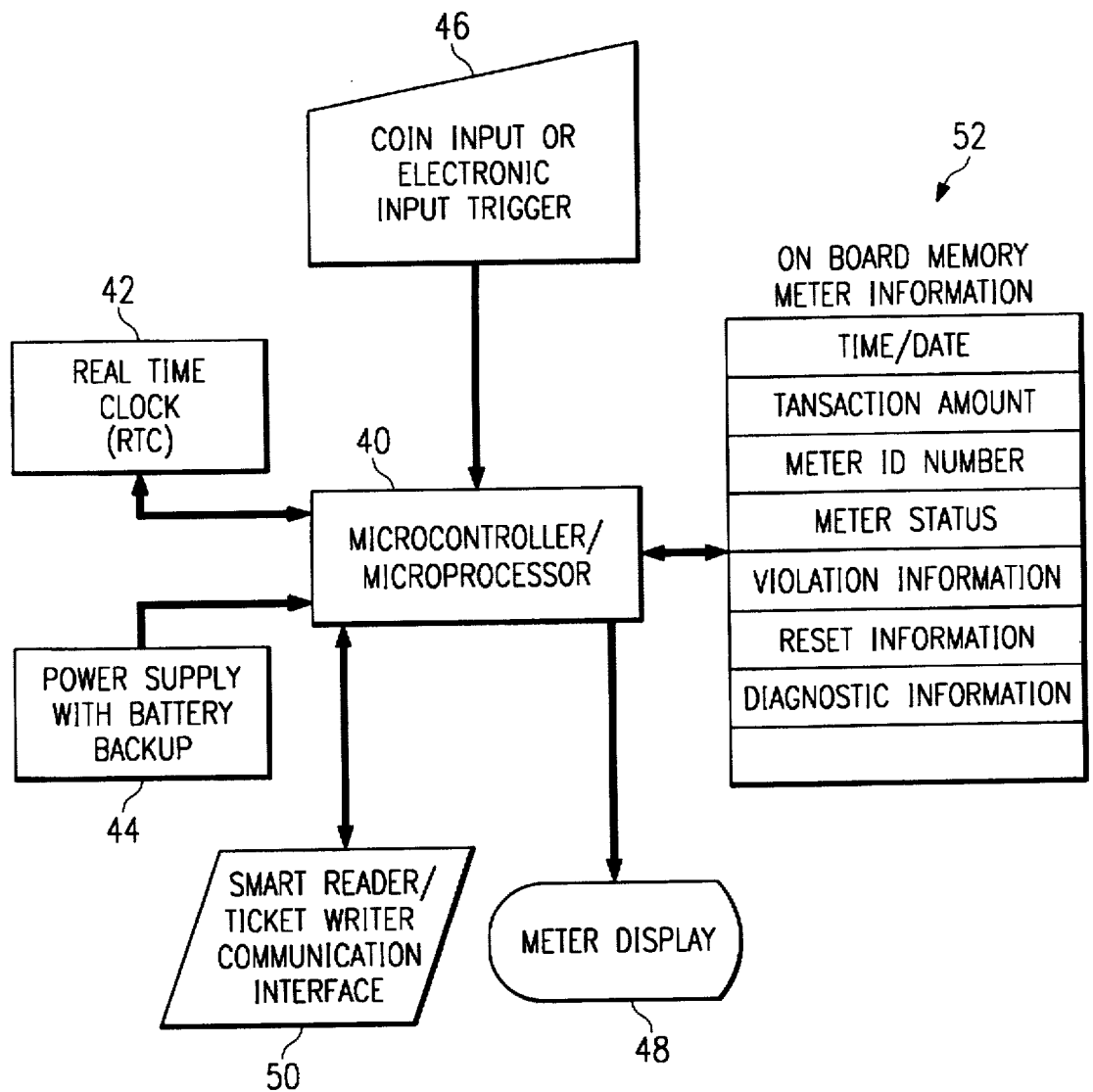
FIG. 2 is block diagram of the electronic parking meter.

FIG. 2 shows a sample electronic parking meter according to the present invention. The meter includes a microcontroller (μC) or microprocessor (μP) 40 (e.g. an 8048 or 8051) connected to both a real time clock 42 and a power supply with a battery backup system 44.

A type of payment, such as coins or a debit card, is inserted into the meter through the coin or electronic input trigger 46 by the parking space user, or an automatic logging system (similar to the systems presently used for "Toll Tags") can trigger the purchase of time. The time and amount of the transaction is recorded by the μC or μP 40 in the memory 52 provided in the meter. The meter display 48 informs the user of the amount of time purchased, and whether the meter is functioning properly.

When a parking enforcement official issues a citation for a parking violation, the citation writing system sends commands to the meter through the communication interface 50, where they are received into the μC or μP 40. The μC or μP 40 accesses the information requested in the memory 52, and if requested, can also perform a diagnostic routine. This information, including the results of the diagnostic routine, is sent back to the citation writing system through the communication interface 50 in addition to a signal from the clock 42 indicating the time of day the information was sent.

Figure 3:
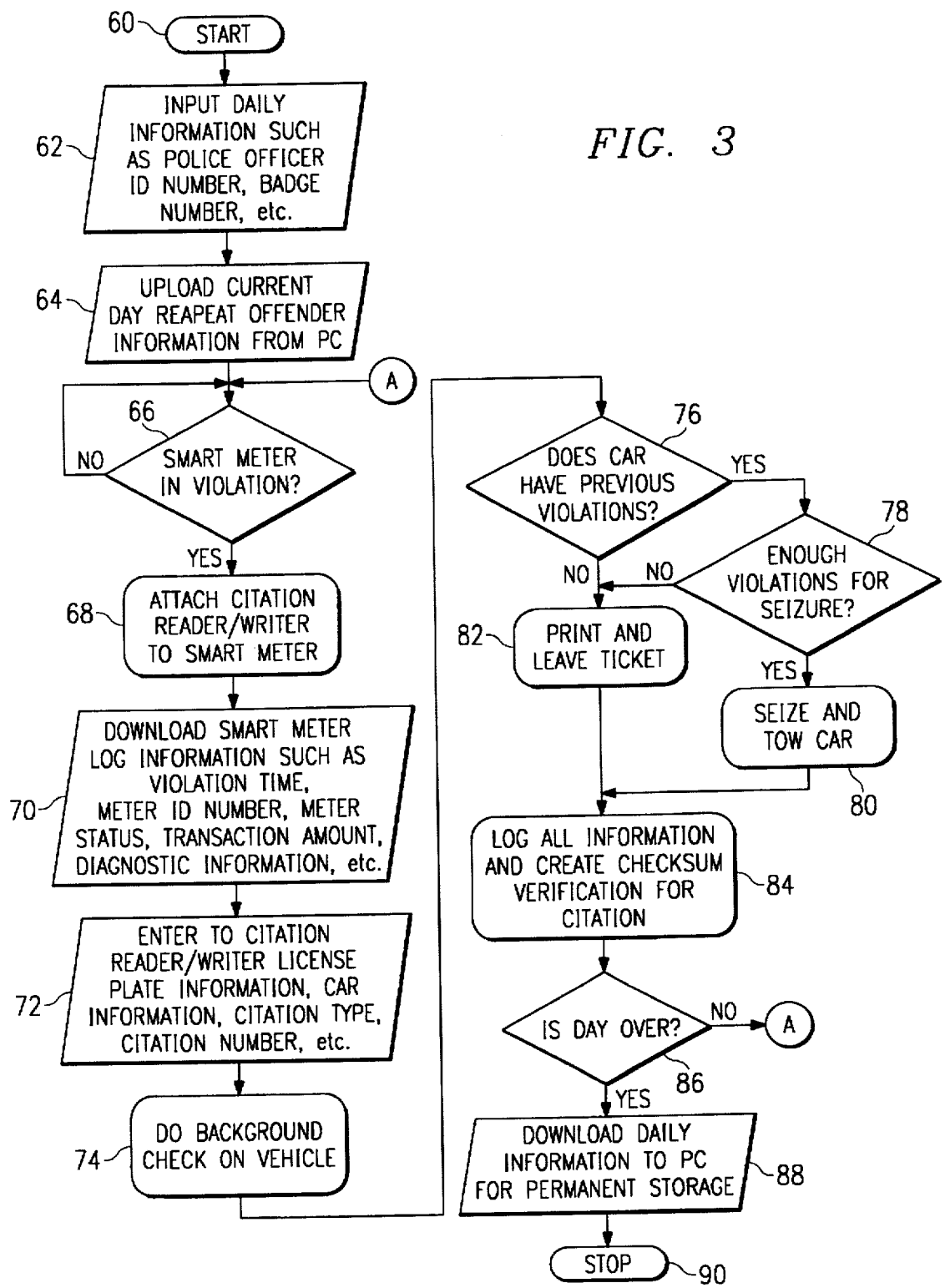
FIG. 3 is a flow chart of the software routine for the electronic citation writing device; and, FIG. 4 is a flow chart of a sample parking citation issuing and enforcement system.

FIG. 3 is a flow chart of a sample software routine for the electronic citation writing system. Reference numbers have been included to correspond with each step in the process. Reference letters show the interconnection between the steps. At the beginning of the day (step 60), the parking enforcement official enters information (step 62) into the citation device to enable the device and to simplify the citation writing process. Various entries such as the name and ID# of the enforcement official are entered only once at the beginning of the day to minimize errors and eliminate repetitious entries. Subsequently, the enforcement official can upload from an offsite computer (step 64) the names and license numbers of repeat parking violators, stolen vehicles, and other related offenses.

When an unattended vehicle is parked in a metered parking space for longer than the purchased time, the meter displays an indication that the time has expired allowing the enforcement official to issue a citation for a parking violation. Once the official determines that the meter is in violation (step 66), the official can attach the citation device to the meter (step 68), to download various information (step 70), including, but not limited to, the meter ID#, the last payment received by the meter, the type of payment received, the time and date of such payment, the status of the meter at the time of payment, the current status of the payment, whether the meter returned to zero normally or was reset, and the results of a diagnostic routine performed by the meter at the request of the citation device. This information can be transmitted to the citation writing system by numerous means including, but not limited to, infrared signal, radio frequency signal, magnetic stripe, or integrated circuit chip read/write method.

The enforcement official then enters the citation information (step 72), such as the license plate number, and vehicle information, into the citation device. The citation number can be entered by the official, or preferably, the citation device can be programmed to automatically print the appropriate citation number. The citation device searches the uploaded information (step 74) to determine if the vehicle has previous violations (step 76). If enough previous violations are discovered (step 78), the usual procedure involves seizing and towing or booting the vehicle (step 80). However, the specific enforcement process varies according to the jurisdiction. If the search does not reveal enough previous violation (step 78), the citation device prints an appropriate citation and the enforcement official leaves a hardcopy on the vehicle (step 82).

The citation writing system then logs all of the information pertaining to the citation (step 84), and preferably, the device generates a checksum (step 84) to provide verification that the citation information entered and the information obtained from the meter were recorded at the same time. At the end of the day (step 86), the parking enforcement official downloads (step 88) all of the citation information to an offsite computer for permanent storage (step 90). This process streamlines the enforcement process and provides a report which can be used in court to rebut defenses such as the amount of time purchased, the time of the violation, or the inoperability of the parking meter.

Figure 4:
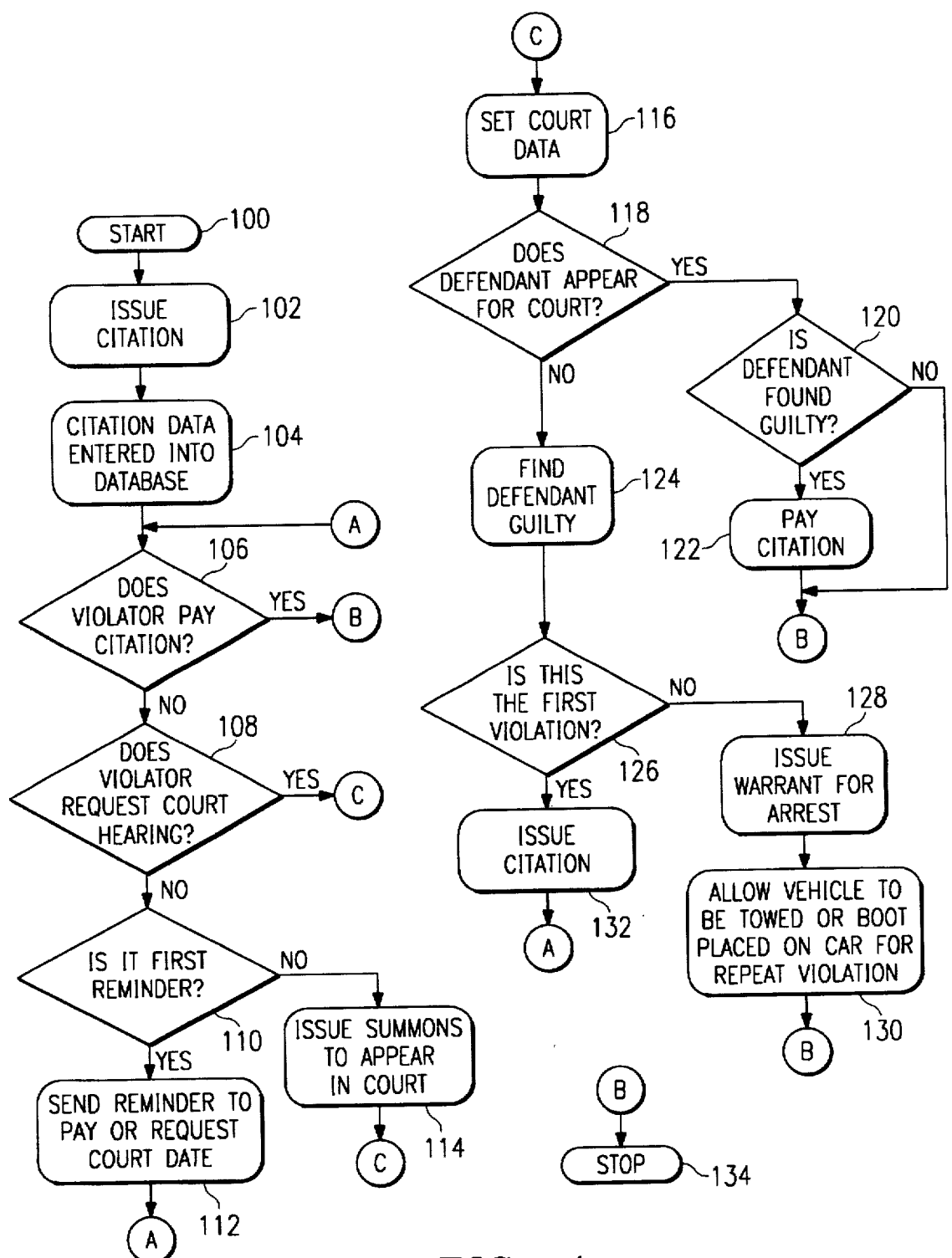

FIG. 4 is a flowchart which shows a sample embodiment of the entire parking citation issuing and enforcement process. Reference numbers have been included to correspond with each step in the process. Reference letters show the interconnection between the steps. This process begins (step 100) when a parking citation is issued (step 102) and entered into a citation database (step 104). The owner of the vehicle that has committed the violation receives the hardcopy of the citation left on the vehicle, which instructs the defendant to pay a fine (step 106) or request a hearing (step 108) by a certain date. If the defendant does not respond to the violation within the time allotted (step 110), a reminder letter is sent (step 112) notifying the defendant of the date and time of the violation, the amount owed, and the date such amount is due. Once again, the defendant has the option of paying the fine (step 106) or requesting a hearing (step 108), however, if no response is received by the due date (step 110), a notice of hearing and summons will be mailed to the defendant (step 114).

At the hearing (step 116), the defendant can assert a defense to the citation. Such defenses include disputing the accuracy of the parking meters, or claiming that the meter returned to zero time remaining prematurely, and/or disputing information on the citation, such as the time of day the violation occurred. The court determines the validity of any defenses (step 120) and has the option of upholding the validity of the citation and requiring the defendant to pay the fine (step 122), or finding the citation invalid (step 134). If the defendant does not appear at the hearing (step 118), the citation is upheld (step 124), and the court can issue a warrant for the arrest of the defendant (step 128), considering any previous outstanding violations (step 126).

If the defendant commits another parking violation, the parking enforcement official can tow or boot the vehicle (step 130) if a warrant has been issued (step 128), or if several outstanding citations have been issued to the defendant (step 126). However, if the defendant paid the fine (step 106) or had the citation held invalid (step 134), the parking enforcement official will only issue another citation (step 132) that will be entered into the citation database to begin the process again (step 104).

Figure 5:
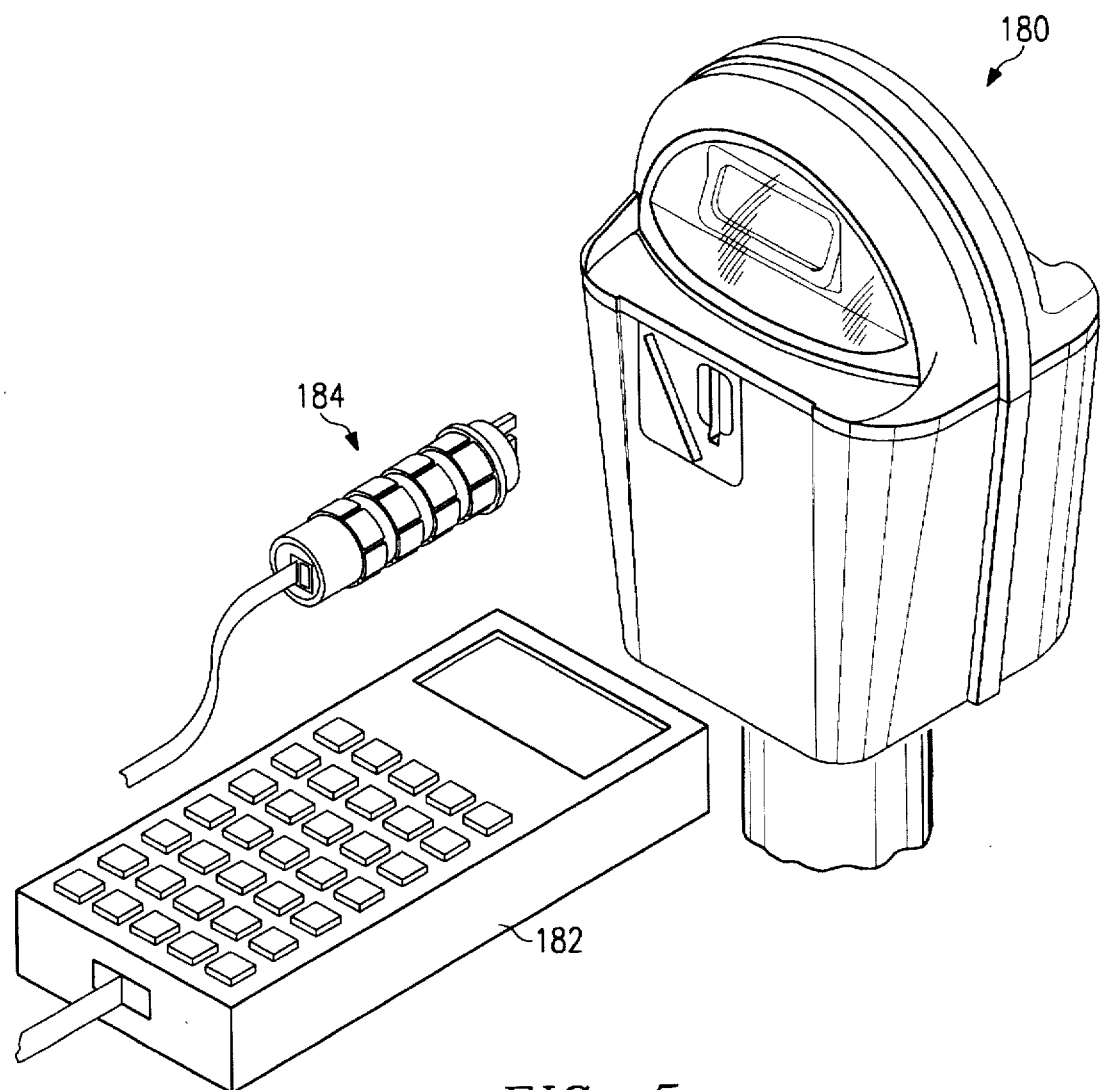
FIG. 5 shows a sample embodiment of a ticket-writer, meter, and probe which provides interface between them.

FIG. 5 shows a sample embodiment of the hardware utilized to implement the innovative system, including meter 180, ticket writer 182, and probe 184, which together gather, store, and communicate the information necessary for effective enforcement.

The innovative parking enforcement system described herein reduces the possibility of the court finding the citation invalid due to any of the defenses listed above by generating a report which contains the citation data entered by the enforcement official and the information obtained from the parking meter at the time the citation was issued. Furthermore, this system enables the parking enforcement official to determine whether previous outstanding violations exist. This allows the official to tow or boot repeat offenders to ensure payment of existing citations. Other benefits include assuring compliance with parking laws, simplifying the enforcement process, and deterring repeat violators.

According to a disclosed class of innovative embodiments, there is provided: A parking enforcement system, comprising: a portable module including at least one microprocessor, said microprocessor being connectable to a data input subsystem, data output circuitry, data storage circuitry, and a communication interface, said communication interface being capable of communicating with an electronic parking meter; said microprocessor being programmed to send commands to said parking meter, through said communication interface, when entering citation data into said module using said data input subsystem; said microprocessor being programmed to receive information from said parking meter, to store said information in said data storage circuitry, and to output, using said data output circuitry, a complete citation record, said citation record including said citation data as well as said information received from said parking meter at the time said citation data was entered.

According to another disclosed class of innovative embodiments, there is provided: A parking enforcement system, comprising: a portable module including at least one microprocessor, said microprocessor being connectable to a data input subsystem, data output circuitry, data storage circuitry, and a communication interface, said communication interface being capable of communicating with an electronic parking meter; said microprocessor being programmed to send commands to said parking meter, through said communication interface, to cause said parking meter to initiate a diagnostic routine, when entering citation data into said module using said data input subsystem; said microprocessor being programmed to receive the results of said diagnostic routine executed by said parking meter, store the results of said diagnostic routine in said data storage circuitry, and to output, using said data output circuitry, a complete citation record, said citation record including said citation data and the results of said diagnostic routine performed on said parking meter at the time said citation data was entered.

According to another disclosed class of innovative embodiments, there is provided: A parking enforcement system, comprising: a portable module including at least one microprocessor, said microprocessor being connectable to a data input subsystem, data output circuitry, data storage circuitry, and a communication interface, said communication interface being capable of communicating with an electronic parking meter; said microprocessor being programmed to send commands to said parking meter, through said communication interface, when entering citation data into said module using said data input subsystem; said microprocessor being programmed to receive information from said parking meter, to store said information in said data storage circuitry, to generate a checksum, and to output, using said data output circuitry, a complete citation record, said citation record including said citation data, said checksum, and said information received from said parking meter at the time said citation data was entered into said module; whereby electronic verification that said citation data and the results of said diagnostic routine were recorded at the same time is provided.

According to another disclosed class of innovative embodiments, there is provided: A method of issuing and enforcing parking citations, comprising the steps of: (a.) providing a portable module including at least one microprocessor, said microprocessor being connectable to a data input subsystem, data storage circuitry, data output circuitry, and a communication interface, said communication interface being capable of communicating with an electronic parking meter; (b.) sending commands, using said microprocessor, through said communication interface, to said parking meter, when entering citation data into said module using said data input subsystem; (c.) receiving information from said parking meter, using said microprocessor, storing said information in said data storage circuitry, and outputting, using said output circuitry, a complete citation record, said citation record including said citation data as well as said information received from said parking meter at the time said citation data was entered.

According to another disclosed class of innovative embodiments, there is provided: A method of issuing and enforcing parking citations, comprising the steps of: (a.) providing a portable module including at least one microprocessor, said microprocessor being connectable to a data input subsystem, data output circuitry, data storage circuitry, and a communication interface, said communication interface being capable of communicating with an electronic parking meter; (b.) sending commands, using said microprocessor, through said communication interface, to said parking meter, when entering citation data into said module, using said data input subsystem, to cause said parking meter to initiate a diagnostic routine; (c.) receiving the results of said diagnostic routine executed by said parking meter, using said microprocessor, storing the results of said diagnostic routine in said data storage circuitry, and outputting, using said output circuitry, a complete citation record, said citation record including the results of said diagnostic routine performed on said parking meter at the time said citation data was entered.

According to another disclosed class of innovative embodiments, there is provided: A method of issuing and enforcing parking citations, comprising the steps of: (a.) providing a portable module including at least one microprocessor, said microprocessor being connectable to a data input subsystem, data storage circuitry, data output circuitry, and a communication interface, said communication interface being capable of communicating with an electronic parking meter; (b.) sending commands, using said microprocessor, through said communication interface, to said parking meter, when entering citation data into said module using said data input subsystem; (c.) receiving information from said parking meter, storing said information in said data storage circuitry, and generating a checksum, using said microprocessor; and (d.) outputting a complete citation record, using said output circuitry, said citation record including said citation data, said checksum, and said information received from said parking meter at the time said citation data was entered; whereby electronic verification that said citation data and the results of said diagnostic routine were recorded at the same time is provided.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, it should be noted that the disclosed innovative ideas are not limited only to systems based on an DS5000 microprocessor, but can also be implemented in systems using 680x0, RISC, or other processor architectures.

It should also be noted that the disclosed innovative ideas are not by any means limited to systems using a single-processor CPU, but can also be implemented in a CWS using multiprocessor architectures.

Additional information, not mentioned in the sample embodiments can also be included in the information stored in the CWS. One example is useful in conjunction with electronic meters which have vehicle presence detectors, which enable the meter to "know" whether or not a vehicle is present in the parking space, and even to reset the time to zero if the vehicle leaves before the time has expired.

Information regarding the times vehicles enter or leave a space can be stored in a CWS, as well as notations that the meter was reset when a vehicle left.

In addition, the nonvolatile memory of the RTC can be EEPROM, battery backed SRAM, or Flash.

What is claimed is:

1. A parking enforcement system, comprising:

a portable module including at least one microprocessor, said microprocessor being connectable to a data input subsystem, data output circuitry, data storage circuitry, and a communication interface, said communication interface being capable of communicating with an electronic parking meter which receives payment for time vended;

said microprocessor being programmed to send commands to said parking meter, through said communication interface, when entering citation data into said module using said data input subsystem;

said microprocessor being programmed to receive information from said parking meter, to store said information in said data storage circuitry, and to output, using said data output circuitry, a complete citation record, said citation record including said citation data as well as said information received from said parking meter at the time said citation data was entered.

2. The system of claim 1, wherein said information includes the last payment received by said parking meter.

3. The system of claim 1, wherein said information includes the type of payment received by said parking meter.

4. The system of claim 1, wherein said information includes the time and date of payment received by said parking meter.

5. The system of claim 1, wherein said information includes the status of said parking meter at the time of the last payment received by said parking meter.

6. The system of claim 1, wherein said information includes the current status of said parking meter.

7. The system of claim 1, wherein said parking meter can be reset, and wherein said information includes whether said parking meter returned to zero normally or was reset.

8. The system of claim 1, wherein said output circuitry is a printer.

9. The system of claim 1, wherein said output circuitry is a communication link through which data in said data storage circuitry can be downloaded to a stationary computer, wherein said data includes said information and said citation data.

10. The system of claim 1, wherein said input subsystem includes a keyboard.

11. The system of claim 1, wherein said input subsystem includes a touch screen display.

12. The system of claim 1, wherein said microprocessor generates a checksum when said information is received by said microprocessor, and wherein said citation record includes said checksum, whereby electronic verification that said citation data and said information were recorded at the same time is provided.

13. A parking enforcement system, comprising:

a portable module including at least one microprocessor, said microprocessor being connectable to a data input subsystem, data output circuitry, data storage circuitry, and a communication interface, said communication interface being capable of communicating with an electronic parking meter;

said microprocessor being programmed to send commands to said parking meter, through said communication interface, to cause said parking meter to initiate a diagnostic routine, when entering citation data into said module using said data input subsystem;

said microprocessor being programmed to receive the results of said diagnostic routine executed by said parking meter, store the results of said diagnostic routine in said data storage circuitry, and to output, using said data output circuitry, a complete citation record, said citation record including said citation data and the results of said diagnostic routine performed on said parking meter at the time said citation data was entered.

14. The system of claim 13, wherein said output circuitry is a printer.

15. The system of claim 13, wherein said output circuitry is a communication link through which data in said data storage circuitry can be downloaded to a stationary computer, wherein said data includes the results of said diagnostic routine and said citation data.

16. The system of claim 13, wherein said input subsystem includes a keyboard.

17. The system of claim 13, wherein said input subsystem includes a touch screen display.

18. The system of claim 13, wherein said microprocessor generates a checksum when the results of said diagnostic routine are received by said microprocessor, and wherein said citation record includes said checksum, whereby electronic verification that said citation data and said information were recorded at the same time is provided.

19. A parking enforcement system, comprising:

a portable module including at least one microprocessor, said microprocessor being connectable to a data input subsystem, data output circuitry, data storage circuitry, and a communication interface, said communication interface being capable of communicating with an electronic parking meter;

said microprocessor being programmed to send commands to said parking meter, through said communication interface, to cause said parking meter to initiate a diagnostic routine, when entering citation data into said module using said data input subsystem;

said microprocessor being programmed to receive information from said parking meter, to store said information in said data storage circuitry, to generate a checksum, and to output, using said data output circuitry, a complete citation record, said citation record including said citation data, said checksum, and said information received from said parking meter at the time said citation data was entered into said module;

whereby electronic verification that said citation data and the results of said diagnostic routine were recorded at the same time is provided.

20. The system of claim 19, wherein said information includes the last payment received by said parking meter.

21. The system of claim 19, wherein said information includes the type of payment received by said parking meter.

22. The system of claim 19, wherein said information includes the time and date of payment received by said parking meter.

23. The system of claim 19, wherein said information includes the status of said parking meter at the time of the last payment received by said parking meter.

24. The system of claim 19, wherein said information includes the current status of said parking meter.

25. The system of claim 19, wherein said parking meter can be reset, and wherein said information includes whether said parking meter returned to zero normally or was reset.

26. The system of claim 19, wherein said output circuitry is a printer.

27. The system of claim 19, wherein said output circuitry is a communication link through which data in said data storage circuitry can be downloaded to a stationary computer, wherein said data includes the results of said diagnostic routine and said citation data.

28. The system of claim 19, wherein said input subsystem includes a keyboard.

29. The system of claim 19, wherein said input subsystem includes a touch screen display.

30. A method of issuing and enforcing parking citations, comprising the steps of:
   (a.) providing a portable module including at least one microprocessor, said microprocessor being connectable to a data input subsystem, data storage circuitry, data output circuitry, and a communication interface, said communication interface being capable of communicating with an electronic parking meter which receives payment for time vended;
   (b.) sending commands, using said microprocessor, through said communication interface, to said parking meter, when entering citation data into said module using said data input subsystem; and
   (c.) receiving information from said parking meter, using said microprocessor, storing said information in said data storage circuitry, and outputting, using said output circuitry, a complete citation record, said citation record including said citation data as well as said information received from said parking meter at the time said citation data was entered.

31. The method of claim 30, wherein said information includes the last payment received by said parking meter.

32. The method of claim 30, wherein said information includes the type of payment received by said parking meter.

33. The method of claim 30, wherein said information includes the time and date of payment received by said parking meter.

34. The method of claim 30, wherein said information includes the status of said parking meter at the time of the last payment received by said parking meter.

35. The method of claim 30, wherein said information includes the current status of said parking meter.

36. The method of claim 30, wherein said parking meter can be reset, and wherein said information includes whether said parking meter returned to zero normally or was reset.

37. The method of claim 30, wherein said output circuitry is a printer.

38. The method of claim 30, wherein said output circuitry is a communication link through which data in said data storage circuitry can be downloaded to a stationary computer, wherein said data includes said information and said citation data.

39. The method of claim 30, wherein said input subsystem includes a keyboard.

40. The method of claim 30, wherein said input subsystem includes a touch screen display.

41. The method of claim 30, wherein said microprocessor generates a checksum when said information is received by said microprocessor, and wherein said citation record includes said checksum, whereby electronic verification that said citation data and said information were recorded at the same time is provided.

42. A method of issuing and enforcing parking citations, comprising the steps of:
   (a.) providing a portable module including at least one microprocessor, said microprocessor being connectable to a data input subsystem, data storage circuitry, data output circuitry, and a communication interface, said communication interface being capable of communicating with an electronic parking meter;
   (b.) sending commands, using said microprocessor, through said communication interface, to said parking meter, when entering citation data into said module, using said data input subsystem, to cause said parking meter to initiate a diagnostic routine; and
   (c.) receiving the results of said diagnostic routine executed by said parking meter, using said microprocessor, storing the results of said diagnostic routine in said data storage circuitry, and outputting, using said output circuitry, a complete citation record, said citation record including the results of said diagnostic routine performed on said parking meter at the time said citation data was entered.

43. The method of claim 42, wherein said output circuitry is a printer.

44. The method of claim 42, wherein said output circuitry is a communication link through which data in said data storage circuitry can be downloaded to a stationary computer, wherein said data includes the results of said diagnostic routine and said citation data.

45. The method of claim 42, wherein said input subsystem includes a keyboard.

46. The method of claim 42, wherein said input subsystem includes a touch screen display.

47. The method of claim 42, further comprising the steps of generating a checksum during said diagnostic routine, using said microprocessor, and outputting said checksum, using said data output circuitry, whereby electronic verification that said citation data and the results of said diagnostic routine were recorded at the same time is provided.

48. A method of issuing and enforcing parking citations, comprising the steps of:
   (a.) providing a portable module including at least one microprocessor, said microprocessor being connectable to a data input subsystem, data storage circuitry, data output circuitry, and a communication interface, said communication interface being capable of communicating with an electronic parking meter;
   (b.) sending commands, using said microprocessor, through said communication interface, to said parking meter, when entering citation data into said module using said data input subsystem, to cause said parking meter to initiate a diagnostic routine;
   (c.) receiving information from said parking meter, storing said information in said data storage circuitry, and generating a checksum, using said microprocessor; and
   (d.) outputting a complete citation record, using said output circuitry, said citation record including said citation data, said checksum, and said information received from said parking meter at the time said citation data was entered;
   whereby electronic verification that said citation data and the results of said diagnostic routine were recorded at the same time is provided.

49. The method of claim 48, wherein said information includes the last payment received by said parking meter.

50. The method of claim 48, wherein said information includes the type of payment received by said parking meter.

51. The method of claim 48, wherein said information includes the time and date of payment received by said parking meter.

52. The method of claim 48, wherein said information includes the status of said parking meter at the time of the last payment received by said parking meter.

53. The method of claim 48, wherein said information includes the current status of said parking meter.

54. The method of claim 48, wherein said parking meter can be reset, and wherein said information includes whether said parking meter returned to zero normally or was reset.

55. The method of claim 48, wherein said output circuitry is a printer.

56. The method of claim 48, wherein said output circuitry is a communication link through which data in said data storage circuitry can be downloaded to a stationary computer, wherein said data includes said information and said citation data.

57. The method of claim 48, wherein said input subsystem includes a keyboard.

58. The method of claim 48, wherein said input subsystem includes a touch screen display.

* * * * *